(12) United States Patent
Mori et al.

(10) Patent No.: US 6,420,437 B1
(45) Date of Patent: Jul. 16, 2002

(54) TITANIUM OXIDE COLLOIDAL SOL AND PROCESS FOR THE PREPARATION THEREOF

(75) Inventors: Kazuhiko Mori; Mitsuru Nakamura; Masanobu Tanaka, all of Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 09/601,034

(22) PCT Filed: Jan. 27, 1999

(86) PCT No.: PCT/JP99/00342

§ 371 (c)(1),
(2), (4) Date: Jul. 26, 2000

(87) PCT Pub. No.: WO99/37582

PCT Pub. Date: Jul. 29, 1999

(30) Foreign Application Priority Data

Jan. 27, 1998 (JP) ............................................ 10-013811
Oct. 5, 1998 (JP) ............................................ 10-282938

(51) Int. Cl.⁷ .......................... B01F 17/14; B01F 17/16; C09C 1/36; C09K 3/18; F21V 9/06
(52) U.S. Cl. .................... 516/90; 106/13; 106/287.19; 106/440; 106/448; 252/588; 502/350
(58) Field of Search ................. 516/90; 106/287.19, 106/440, 448, 13; 502/350; 252/588

(56) References Cited

U.S. PATENT DOCUMENTS

| | | | |
|---|---|---|---|
| 2,819,177 A | | 1/1958 | Conn et al. |
| 3,147,131 A | * | 9/1964 | Kingsbury .................. 106/448 |
| 3,567,479 A | * | 3/1971 | Portes et al. ................ 106/448 |
| 3,582,275 A | | 6/1971 | Sugahara et al. |
| 3,663,284 A | * | 5/1972 | Stancioff et al. ......... 106/448 X |
| 4,448,609 A | * | 5/1984 | Tear et al. ................ 516/90 X |
| 4,576,921 A | * | 3/1986 | Lane ......................... 516/90 X |
| 5,049,309 A | * | 9/1991 | Sakamoto et al. ............. 516/90 |
| 5,059,248 A | * | 10/1991 | Signorino et al. ......... 516/90 X |
| 5,698,205 A | * | 12/1997 | Brückner et al. .......... 516/90 X |
| 5,759,251 A | * | 6/1998 | Nakamura et al. .. 106/287.19 X |

FOREIGN PATENT DOCUMENTS

| | | | |
|---|---|---|---|
| DE | 1 271 862 | * 7/1968 | .................. 106/448 |
| EP | 0376216 A | 7/1990 | |
| EP | 0684075 A | 11/1995 | |
| JP | 7-89722 | 4/1995 | |
| JP | 10-18082 | 1/1998 | |

OTHER PUBLICATIONS

Riskin et al. "Colloidal stability of titanium dioxide sols in concentrated hydrochloric Acid solutions" (1970), Chemical Abstracts No. 79:70516.

* cited by examiner

Primary Examiner—Richard D. Lovering
(74) Attorney, Agent, or Firm—Paul E. White, Jr.; Manelli Dension &Selter, PLLC

(57) ABSTRACT

A neutral titanium dioxide colloid sol having a high stability in a neutral range and capable of forming a colorless transparent coating even when dried at room temperature is produced by mixing an acid titanium dioxide sol comprising 50 to 100 parts by weight of titanium dioxide colloidal particles and 5 to 50 parts by weight of a chelating agent for titanium ions with 1 to 50 parts by weight of an alkaline substance comprising at least one of alkali metal compounds and amine compounds, and optionally by adjusting the pH value of the liquid mixture to 5 to 10, or adjusting the pH value of the liquid mixture to 6 to 10, and then applying a deionization treatment to the mixture to thereby charge the titanium dioxide colloidal particles with negative electricity.

8 Claims, No Drawings

TITANIUM OXIDE COLLOIDAL SOL AND PROCESS FOR THE PREPARATION THEREOF

TECHNICAL FIELD

This application is a 35 U.S.C. 371 of PCT/JP99/00342 filed Jan. 27, 1999 which designated the U.S.

The present invention relates to a titanium dioxide sol and a method of producing the same. More particularly the present invention relates to a titanium dioxide colloid sol usable as a semiconductor photocatalyst and a method of producing the same. The titanium dioxide colloid sol can be used as a material for various functional coating agents for the purpose of ultraviolet ray-absorption, stain prevention, hydrophilization, preventing fogging, preventing fungus, deodorizing and for water treatment.

BACKGROUND ART

AS ceramic coating materials which are excellent in heat resistance and wear resistance in comparison with organic coating materials, alkali metal silicate salts, phosphate salts, silica sol and metal oxide coating materials are known.

These ceramic coating materials have the characteristics of inorganic coating materials, for example, excellent heat resistance and wear resistance. Currently, attempts to impart new functions to ceramic coatings has been made mainly for metal oxide coatings.

Among the various ceramics, titanium dioxide can exhibit an excellent photocatalytic effect and when ultraviolet rays are irradiated thereto, the titanium dioxide exhibits a high oxidizing activity. Accordingly, it is known that when the titanium dioxide having an excellent photocatalytic activity is located on a surface of a material, for example, a metal, glass or ceramics, to be coated, the titanium dioxide contributes to enhancing the stain prevention, decomposition of odor-generating substances, water-treatment, rust prevention, prevention of fungus, prevention of algae propagation and the decomposition of hard decomposable waste materials. A plurality of titanium dioxide coating materials for the purpose of forming titanium dioxide coatings having the above-mentioned characteristics on substrate surfaces and methods of producing the coating materials have been provided.

As a method of forming a titanium dioxide coating, the method in which a hydrolysis product of a titanium alkoxide is coated, namely a sol-gel method, is most popular. As a method similar to the sol-gel method, Japanese Unexamined Patent Publication No. 4-83,537 discloses a method in which a mixture of a titanium alkoxide with an amide or glycol is employed, and Japanese Unexamined Patent Publication No. 7-100,378 discloses a method in which a mixture of titanium alkoxide with an alcohol amine is employed.

Also, as a method for producing a titanium dioxide sol, other than the above-mentioned methods, Japanese Unexamined Patent Publication No 6-293,519 discloses a method in which fine titanium dioxide particles crystallized by water heat-treatment are dispersed in an acid solution having a pH value of 3 or less, and the resultant dispersion can be employed for coating.

However, the above-mentioned sol-gel method or the method in which the titanium dioxide colloid particles are deagglomerated or dispersed are greatly disadvantageous in that since the colloidal solution is an acidic solution, when the colloidal solution, is coated on a metal or paper surface, the coated material is corroded or deteriorated. Also, there is a disadvantage that even when the colloidal solution is coated on a material having a high acid resistance, for example, a resin, a ceramic or glass, the coating device, for example, a coater or a spray gun, and a printing machine are corroded and the working atmosphere for the coating workers is degraded.

As a means for solving the above-mentioned problems, Japanese Unexamined Patent Publication No. 9-71,418 discloses a sol liquid comprising hydrogen peroxide and titanium dioxide and a method of producing the sol liquid. The sol liquid is advantageous in that the sol liquid can be neutralized. However, since an oxidizing agent is contained, the sol liquid is disadvantageous in that the effect of the sol liquid for preventing the metal corrosion is low, the sol liquid is colored yellow, and a colorless coating is difficult to be formed from the sol liquid unless the coating is heat-dried.

DISCLOSURE OF THE INVENTION

An object of the present invention is to solve the above-mentioned problems of the conventional photocatalytic titanium dioxide solution and to provide a titanium dioxide colloid sol which is stable in a neutral condition to allow the coating procedure with the sol to be safely carried out and enables a colorless transparent coating to be formed even when dried at room temperature, and a method of producing the same.

The above-mentioned object can be attained by the titanium dioxide sol and the methods of producing the same, of the present invention.

The titanium dioxide colloid sol of the present invention comprises 50 to 100 parts by weight of titanium dioxide colloidal particles charged with negative electricity and 5 to 50 parts by weight of a complexing agent and 1 to 50 parts by weight of an alkaline substance.

The titanium dioxide colloid sol of the present invention preferably has a pH value of 5 to 10.

The method (1) of the present invention for producing a titanium dioxide colloid sol comprises mixing an alkaline substance into an acid titanium dioxide colloid sol containing 50 to 100 parts by weight of titanium dioxide colloid sol and 5 to 50 parts by weight of a completing agent, to adjust the pH value of the sol to a level of 5 to 10, to thereby cause the titanium dioxide colloidal particles to be charged with negative electricity.

The method (2) of the present invention, for producing a titanium dioxide colloid sol, comprises mixing an alkaline substance into an acid titanium dioxide colloid sol comprising 50 to 100 parts by weight of titanium dioxide colloidal particles and 5 to 50 parts by weight of a complexing agent to adjust the pH value of the resultant sol to a level of 6 to 12, and applying a deionization treatment to the sol to thereby cause the titanium dioxide colloidal particles to be charged with negative electricity.

BEST MODE OF CARRYING OUT THE INVENTION

The inventors of the present invention prepared a titanium dioxide colloid solution by reacting an inorganic titanium salt, for example, titanium chloride or titanium sulfate, or titanium alkoxide with water under an acid condition to hydrolyze the titanium salt or alkoxide, and analyzed the electricity-charging behavior of the acid colloid sol of the titanium dioxide. As a result of the analysis, it was confirmed that the titanium dioxide colloidal particles are stably charged with positive electricity in an acid range and, when the colloid solution is neutralized with an alkaline solution into a pH range of from 3 to 5 the titanium dioxide colloidal particles lose almost all of the electric charge and become significantly unstable and are firmly agglomerated with each other to such an extent that the agglomerated particles are difficult to separate from each other; and when the alkaline property of the colloid solution is further enhanced, the above-mentioned agglomerated titanium dioxide colloidal particles are charged with negative electricity.

Then, the inventors of the present invention further researched means for imparting both a stable electric charge and a high dispersibility to the titanium dioxide colloidal particles even in a neutral range.

As a result of the further research, a phenomenon that, when an acid titanium dioxide colloid sol is mixed with an aqueous solution of an alkali metal hydroxide or ammonia to shift the pH value of the sol to alkaline range, the titanium dioxide colloidal particles are strongly agglomerated with each other to such an extent that the agglomerated particles cannot be separated from each other, and a slurry-like suspension is formed, was found. Also, it was found that the above-mentioned phenomenon is due to the titanium ions $Ti^{4+}$ present in the sol liquid forming colloidal titanium hydroxide, and the titanium dioxide particles are bonded to each other through the colloidal titanium hydroxide, and that, since the charge of the colloidal particles with negative electricity is low in the neutral range, the repelling force generated between the particles is weak.

Further, it was found that the titanium dioxide colloidal particles can be charged with negative electricity by mixing an acid titanium dioxide colloid sol with an complexing agent selected from polyvalent carboxylic acids, hydroxycarboxylic acid and condensed phosphoric acids, for example, pyrophosphoric acid, which can form a complex with $Ti^{4+}$ ions, to surface-modify the titanium dioxide colloidal particles, and then by mixing the complexing agent-mixed colloid sol with an alkaline additive, for example, an aqueous solution of ammonia or morpholine, to increase the pH value of the colloid sol to a desired level; and that a stably dispersed titanium dioxide colloid sol can be obtained by charging the titanium dioxide colloidal particles with negative electricity in a neutral to alkaline pH range; and that a colorless transparent titanium dioxide coating having an excellent adhesive property can be obtained by coating the above mentioned stably dispersed titanium dioxide colloid sol on a target particle and by drying the coated sol at room temperature.

Still further, it was found that with respect to the composition of the titanium dioxide sol, a neutral sol comprising a titanium dioxide colloidal particle component, charged with negative electricity, a complexing agent and a alkaline component exhibit a good stability and dispersibility and provide the above-mentioned target performances.

The method of producing the titanium dioxide sol having the above-mentioned composition was further studied. AS a result, it was found that a titanium dioxide sol having a low content of impurity can be obtained by adding an alkaline substance to a sol comprising a titanium dioxide colloidal particle component and a complexing agent component, to adjust the pH of the sol into a neutral to alkaline range, and subjecting the sol liquid to a deionization treatment, for example, a dialysis or an ion-exchange resin treatment. The method of the present invention was completed by the above-mentioned finding.

The titanium dioxide sol of the present invention comprises 50 to 100 parts by weight of titanium dioxide colloidal particles, and the titanium dioxide colloidal particles are charged with negative electricity in a neutral sol solution. If the titanium dioxide colloidal particles are charged with positive electricity in the neutral range, the dispersion of the colloidal particles becomes unstable The type of electricity, positive or negative of the particles can be easily determined by a zeta potential-measurement apparatus, etc.

The types of the titanium dioxide usable for the present invention include anatase type titanium dioxide (including metatitanic acid), orthotitanic acid and other titanium dioxides such as rutile titanium dioxide. Among these, the anatase titanium dioxide (including metatitanic acid) and orthotitanic acid are most preferably used.

In the present invention, there is no specific limitation to the particle size of the titanium dioxide colloidal-particles. Generally, the particle size is preferably 1 nm to 500 nm, more preferably 3 to 120 nm.

In the present invention, the titanium dioxide colloidal particles are produced by dissolving at least one member selected from inorganic titanium compounds, for example, titanium chloride, titanium oxy-chloride, titanium sulfate and titanyl sulfate in water; optionally adding hydrochloric acid or nitric acid as a catalyst to the solution; and hydrolyzing the titanium compound at room temperature or by heating Also, as another method of preparing titanium dioxide colloid particles, a hydrolytic method of preparing organic titanium compounds, for example, titanium alkoxides and titanium acetylacetonate, can be utilized. Since the titanium dioxide colloidal particles produced in an acid solution by the above-mentioned methods are charged with positive electricity, it is necessary that when a sol having a pH value of 6 or more is prepared by adding an alkaline component to the sol, the titanium dioxide particles are charged with negative electricity by adding a complexing agent into the sol.

In the titanium dioxide sol of the present invention, the complexing agent must be contained in a proportion of 5 to 50 parts by weight. The complexing agent usable for the present invention includes chelating compounds. The chelating compounds preferably contain at least one carboxyl group in the molecular skelton thereof, and have a high chelating activity to $Ti^{4+}$ ions. The preferable chelating compounds include polyvalent carboxylic acids and hydroxycarboxylic acids, for example, gluconic acid, glucolic acid, lactic acid, tartaric acid, citric acid, malic acid and succinic acid; and condensed phosphoric acids, for example, pyrophosphoric acid and tripolyphosphoric acid, and salts of the above-mentioned acids. Most preferable complexing agents are the above-mentioned condensed phosphoric acids, particularly pyrophosphoric acid and tripolyphosphoric acid.

In the titanium dioxide colloid sol of the present invention, an alkaline substance must be contained in an amount of 1 to 50 parts by weight in addition to the complexing agent, and the pH value of the sol liquid is preferably adjusted within the range of from 5 to 9 The alkaline substance contributes to neutralizing acid ions, for example, chlorate ions and sulfate ions remaining in the sol liquid and to imparting negative electricity charge with an increased stability to the titanium dioxide colloidal particles.

The alkaline substance usable for the titanium dioxide colloid sol preferably comprises at lease one member selected from ammonium compounds, alkali metal compounds, and amines, and thus, for example, ammonium hydroxide (ammonium water), sodium hydroxide, potassium hydroxide, lithium hydroxide, sodium silicate, and polyamines, for example, ethylenediamine and triethylenetetramine may be employed. Also, as preferable alkaline substances, oxazine compounds, for example, morpholine and piperidine and choline compounds. In case where the titanium dioxide colloid sol of the present invention is employed as a coating material, the oxazine and piperidine compound, ammonium hydroxide and low molecular weight amine compounds, for example, triethanol amine, which are easily evaporated from the coating layer while the coating layer is sintered, are preferably employed.

For the complexing agent and the alkaline substance, certain compounds having both the complexing activity and the alkaline property, for example, ammonium pyrophosphate, ammonium lactate and hydrogen choline tartarate, may be employed.

The titanium dioxide colloid sol of the present invention may contain, in addition to the above-mentioned components, chlorine ions, sulfate ions and/or alcohol which are derived from titanium material used for the preparation of the sol. However, the remaining components present, in addition to the above-mentioned components, in the sol substantially consist of water. When the titanium dioxide colloid sol or the present invention is employed as a coating material, a portion of the water component is preferably replaced by a water-soluble solvent comprising an alcohol, glycol or ketone.

In this case, the property of the resultant coating can be improved by adding a silica sol and/or a silane derivative, for example, an alkyltrimethoxysilane, as a binder, to the titanium dioxide colloid sol.

In the methods (1) and (2) of the present invention, if a ratio in weight of the complexing agent to the titanium dioxide colloidal particles is too low, the colloidal particles are insufficiently dispersed and a stable sol cannot be obtained. Also, if the weight content of the completing agent is too high, the resultant coating exhibits an undesired reduced hardness. Also, the content of the alkaline substance is too high, the hardness of the resultant coating is too low, or a metal such as aluminum or zinc is undesirably corroded. Further, if the alkaline substance content is too low, the resultant sol is undesirably acid.

In the method (1) of producing the titanium dioxide colloid sol of the present invention, an acid titanium dioxide sol comprising 50 to 100 parts by weight of titanium dioxide colloidal particles and 5 to 50 parts by weight of a complexing agent is added to an alkaline substance to adjust the pH value of the sol liquid to 5 to 10 and to thereby cause the titanium dioxide colloided particles to be charged with negative electricity.

The acid titanium dioxide sol usable for the methods (1) and (2) of the present invention can be prepared by dissolving at least one inorganic titanium compound selected from titanium chloride, titanium oxychloride, titanium sulfate and titanyl sulfate in water; optionally adding, into the resultant solution; a catalyst consisting of hydrochloric acid and/or nitric acid; and hydrolyzing the titanium compound at room temperature or by heating. Alternatively, the titanium dioxide colloidal particles can be prepared by hydrolyzing an organic titanium compound, for examples, a titanium alkoxide or titanium acetylacetonate.

The complexing agent usable for the methods (1) and (2) of the present invention is preferably selected from chelating compounds such as polyvalent carboxylic acids and hydroxycarboxylic acids which have at least one carboxylic group per molecular skeleton, for example, gluconic acid, glycolic acid, lactic acid, tartaric acid, citric acid, malic acid and succinic acid, and condensed phosphoric acids, for example, pyrophosphoric acid and tripolyphosphoric acid, and salts of the above-mentioned acids.

The alkaline substance usable for the methods (1) and (2) of the present invention for producing the titanium dioxide sol is preferably selected from ammonium compounds, for example, ammonium hydroxide, amines, for example, ethanolamine, oxazine compounds, for examples morpholine, and piperidine and choline compounds. Where the titanium dioxide colloid sol is used as a coating material, the alkali metal hydroxides are relatively not preferred. The content of the alkaline substance in the sol corresponds to an amount of the alkaline substance which causes the pH value of the sol to be adjusted within the range of from 5 to 10. By adding the alkaline substances, the titanium dioxide colloidal particles in the titanium dioxide colloid sol are charged with negative electricity.

In the production method (1) of the present invention, when a silane derivative, for example, epoxysilane or methylsilane, or a partial hydrolysis product of the silane derivative, is added into the mixture liquid of the titanium dioxide colloidal particles with complexing agent, before the alkaline substance is added to the mixture liquid, and then the alkaline substance is added to the mixture, the electric charge on the resultant titanium dioxide colloidal particles is more stabilized, and when this sol is used as a coating material, the coating procedure can be carried out with an improved coating efficiency.

The titanium dioxide colloidal particles and complexing agent usable for the production method, (2) of the present invention may be the same as the titanium dioxide colloidal particles and the complexing agent usable for the production method (1) of the present invention. Also, the alkaline substances usable for the production method (2) may be the same as those usable for the production method (1) of the present invention, and are preferably selected from alkali metal compounds such as sodium hydroxide, potassium hydroxide and lithium hydroxide.

In the production method (2) of the present invention, the alkaline substance is employed in an amount necessary to increase the pH value of the sol liquid to 6 to 12, preferably 7 to 9. If the pH of the sol liquid, after the alkaline substance is added to the sol liquid, is less than 6, the resultant dispersion of the colloidal particles is insufficient, and if the pH of the sol liquid is more than 12, the resultant titanium dioxide colloid sol exhibit an unpreferable strong corroding property for the metal material brought into contact with the colloid sol.

In the production method (2) of the present invention, after the alkaline substance is added, the resultant sol liquid is subjected to a deionization treatment, to remove ions remaining in the sol liquid.

The deionization treatment is preferably carried out in accordance with a diffusion dialysis method using a semi-permeable membrane, an electric dialysis method using an ion-exchange membrane, or an ion-exchange resin-contact treatment method. The application of the deionization treatment enables contaminating ions, for example, alkali metal ions and-acid anions contained in the titanium dioxide sol, to be removed, the degree of purity of the titanium dioxide to be increased, and a sol having a good coating-forming property and a high practical usefulness to be obtained. By the deionization treatment, the pH value of the titanium dioxide colloid sol is preferably adjusted to 5 to 9, more preferably 6 to 8.5.

Where the titanium dioxide colloid sol of the present invention is coated on an article to be coated, the amount of titanium dioxide contained in the resultant coating is preferably controlled to 200 to 2000 mg/m². The coated sol layer may be dried by a heat-drying method or at room temperature. Where an organic compound such as a carboxylic acid is employed as a complexing agent, and the coated sol layer is dried at a temperature of 100° C. or less, preferably the completing agent is decomposed by irradiating ultraviolet rays having a wavelength less than 400 nm to the coated sol layer, during or after the drying procedure for the coated sol layer.

In the negative electricity-charged titanium dioxide colloid sol of the present invention tetravalent titanium ions remaining as a non-reacted component in the conventional acid titanium dioxide sol are masked by the complexing agent comprising a chelating compound and/or a condensed phosphoric acid or a salt thereof, to thereby prevent gelation and precipitation of the titanium dioxide colloidal particles, in a neutral range; and a negative electric charge on the complexing agent absorbed in the titanium dioxide colloidal particles neutralizes a positive electric charge on the titanium dioxide colloid particles and further causes the titanium dioxide colloidal particles to be charged with negative electricity; and thus a stable neutral titanium dioxide sol is obtained. After a coating of the titanium dioxide colloid sol is formed, the organic chelating agent contained in the coating is decomposed to produce water and carbon dioxide by the photocatalytic effect of the titanium dioxide, and thus does not exhibit a harmful effect.

Also, the acid property of the carboxyl groups of the organic chelating compound and the acid property of the contaminative acid anions such as $Cl^-$ and $SO_4^{2-}$ derived from the titanium dioxide production material can be neutralized by addition of the alkaline substance such as ammonium compound, an amine, an alkali metal compound or an oxazine or piperidine compound, into the sol to convert the titanium dioxide colloid sol to a completely neutral sol.

The negative electricity-charged titanium dioxide colloid sol can be produced by adding the above-mentioned alkaline substance to the acid titanium dioxide-sol coating the complexing agent. Further, by applying a deionization treatment by a dialysis method using a semipermeable membrane to the above-mentioned sol, a titanium dioxide colloid sol having a further improved quality can be obtained,

EXAMPLES

The present invention will be further explained by the following examples which do not restrict the scope of present invention in any way.

Examples 1 to 18 and Comparative Examples 1 to 4

In Examples 1 to 18 and Comparative Examples 1 to 4, the following materials were employed.
(1) Titanium Dioxide Colloid
One of the following two types (A and B) of colloids was employed.
A) In Comparative Example 1, Comparative Example 2, Examples 1 to 7, Example 12, Example 14, Examples 16 to 18, a titanium dioxide colloid prepared by the following procedures was employed.
An aqueous solution of titanium chloride (made by SUMITOMO SITIX K.K., Ti: 15 to 16% by weight) was diluted with water, And then deionized by using an ion exchange membrane, to provide an aqueous titanium oxychloride solution. The solution was heated to a temperature of 70 to 85° C., to hydrolyze the titanium oxychloride. A titanium dioxide colloid sol having a pH value of 1 to 2 was obtained. The resultant titanium dioxide crystal particles had a particle size of 0.002 to 0.01 μm, determined by a permeation type electron microscope. The colloid sol contained the titanium dioxide colloidal particles in a dry weight content of 5.0%.

B) In Comparative Example 3, Comparative Example 3, Examples 8 to 11, Example 13 and Example 15, titanium dioxide powder particles (made by NIHON AEROSIL K.K., having a particle size of 0.02 μm, and a type of anatase-rutile mixture) were dispersed in water, and hydrochloric acid was added to the dispersion to adjust the pH value of the dispersion to 1.5. The resultant titanium dioxide colloid sol was employed.

(2) Complexing Agent
A complexing agent selected from glyconic acid, glycolic acid, lactic acid, citric acid, tartaric acid, malic acid, pyrophoshporic acid and tripolyphosphoric acid, as shown in Tables 1 and 2, was employed. These chemicals were first class chemical reagents, made by WAKO JUNYAKU K.K.

(3) Alkaline Substance
An alkaline substance selected from ammonia water (ammonia hydroxide, sodium hydroxide, potassium hydroxide, lithium hydroxide, triethanolamine, triethylenetetramine, morpholine (tetrahydro-1,4-oxyazine), piperidine and choline, as shown in Tables 1 and 2 was employed. These chemicals were, or corresponded to, first class chemical reagents or the compositions of the titanium dioxide colloid sols used in the comparative examples and the examples are shown in Tables 1 and 2.

With respect to the resultant sols, the types (positive and negative) of the charged electricity on the titanium dioxide particles were determined by a Zeta potential measurement apparatuses.

Each sol was coated in an amount of 10 ml/m² on a surface of a substrate selected from aluminum, acid paper sheet, zinc-plated steel strip or a stainless steel strip, by using a bar coater, and was dried at 80° C. With respect to the resultant coatings formed on the substrate, the appearance and photocatalytic activity (in terms of fatty acid-decomposing rate, units: mg/m²·dry) were measured.

AS a substrate, an aluminum alloy was used in comparative Example 1, Example 1, Example 5, Example 7, Example 8, Example 13 and Example 17; an acid paper sheet was employed in Comparative Example 2, Example 3 and Example 6; a zinc-plated steel strip was used in Comparative Example 3, Example 2, example 11 and Example 12; a steel strip was employed in Comparative Example 4, Example 4 and Examples 9 and 10; and a stainless steel strip (SUS 304) was employed in Example 14 and Example 16. Further, in Examples 15 and 18, a polyester film coated with a silicone resin primer was employed as a substrate.

As a starting titanium dioxide sol, the above-mentioned acid sol A) or B) was employed. In Comparative Example 1, no Complexing agent was added to the sol liquid and the alkaline substance was added to the sol liquid to adjust the pH value of the sol liquid to 7 to 8. Also, in Comparative Example 2, Comparative Example 4, Examples 1 to 4, examples 8 and 9 and Examples 12 to 15, the complexing agent is added to the acid sol, and then the alkaline substance was added thereto to adjust the pH value of the sol to that as shown in Table 1.

Further, in Comparative Example 3, Examples 5 to 7 and Examples 11 and 12, the acid sol A) or B) was employed, the completing agent was added to the sol and then the alkaline substance was added to such an extent that the pH value of the alkaline substance-added sol reached a level of 6 to 12, to disperse the resultant titanium dioxide. Furthermore, in Example 5, Example 6, Example 10 and Examples 16 to 18, the resultant titanium dioxide colloid sol liquid was diffuse-dialyzed through a semi-permeable membrane (regenerated cellulose film) in deionized water for 24 hours. Still furthermore, in Example 7, Example 11 and Example 18, the sol liquid was subjected to a deionization treatment, in place of the diffuse-dialysis treatment, in which the sol liquid was passed through a column packed with an anion resin and a cation resin.

The properties of the resultant coatings were evaluated by the test methods and evaluation standards shown below.

Appearance of Coating

Generation of rust and discoloration of a specimen was observed by the naked eye and evaluated into two classes, namely, Good and Bad.

Closs Adhesion

The close adhesion of a specimen coating was tested in accordance with JIS K 5400, Cross Cut Adhesion Test of Coating, and was evaluated in three classes, namely, Good, Slightly bad and Bad, Hardness of Coating A coating of a specimen was subjected to a pencil hardness test in accordance with JIS K 500 in which the coating was scratched by pencils for the pencil scratching test, the hardness of the coating was represented by the pencil hardness. This test was applied to the specimens other than paper substrate specimens.

Photocatalytic Activity

A specimen, on which a coating was coated and dried, was coated with a solution of stearic acid in ethanol, ultraviolet rays from a 20 W black lamp were irradiated toward the coating for 24 hours, and a fatty acid decomposition rate per 24 hours (units: $mg/m^2 \cdot dry$) was obtained from a difference in weight of the specimen between before and after the irradiation.

The compositions of the titanium dioxide colloid sols and properties of the coatings of Examples 1 to 18 and Comparative Examples 1 to 4 are shown in Tables 1 and 2.

TABLE 1

| | | Composition and properties of produced TiO$_2$ sol | | | | | Properties of coating | | | | |
|---|---|---|---|---|---|---|---|---|---|---|---|
| | Example No. | TiO$_2$ (part by wt) | Electricity charge | Chelating agent (part by wt) | Alkaline substance (part by wt) | pH | Dispersion | Appearance | Adhesion | Pencil hardness | Photocatalytic activity |
| Comparative Example | 1 | 80 | − (*)$_3$ | — (—) | 15 | 7.2 | Aggl (*)$_1$ | Bad, Whitened | Bad | B | 150 |
| | 2 | 60 | + (*)$_4$ | Glycolic acid (12) | 0.1 | 2.1 | Disp (*)$_2$ | Bad, Discolored | Slightly Bad | — | 210 |
| | 3 | 80 | − | Gluconic acid (2) | 18 | 8.0 | Aggl. | Bad, Whitened | Bad | 2B | 160 |
| | 4 | 40 | + | Lactic acid (70) | 0.5 | 2.3 | Disp. | Bad, Rusted | Slightly Bad | 3B | 180 |
| Example | 1 | 80 | − | Glycolic acid (20) | 5 | 5.6 | Disp. | Good | Good | H | 230 |
| | 2 | 70 | − | Gluconic acid (60) | 18 | 8.5 | Disp. | Good | Good | H | 210 |
| | 3 | 90 | − | Citric acid (40) | 9 | 7.6 | Disp. | Good | Good | — | 240 |
| | 4 | 55 | − | Tartaric acid (25) | 3 | 5.2 | Disp. | Good | Good | H | 220 |
| | 5 | 80 | − | Malic acid (8) | 15 | 8.2 | Disp. | Good | Good | 2H | 210 |
| | 6 | 70 | − | Lactic acid (10) | 6 | 7.0 | Disp. | Good | Good | — | 280 |
| | 7 | 60 | − | Gluconic acid (20) | 1.5 | 5.9 | Disp. | Good | Good | H | 320 |
| | 8 | 50 | − | Glycolic acid (40) | 12 | 8.3 | Disp. | Good | Good | H | 220 |
| | 9 | 80 | − | Citric acid (25) | 10 | 7.9 | Disp. | Good | Good | H | 230 |
| | 10 | 60 | − | Glycolic acid (6) | 18 | 9.2 | Disp. | Good | Good | H | 250 |
| | 11 | 70 | − | Lactic acid (10) | 12 | 9.6 | Disp. | Good | Good | H | 330 |

Note:
(*)$_1$ Aggl.: Agglomerated
(*)$_2$ Disp.: Dispersed
(*)$_3$ −: Negative electricity
(*)$_4$ +: Positive electricity

TABLE 2

| | | Composition and properties of produced TiO$_2$ sol | | | | | Properties of coating | | | | |
|---|---|---|---|---|---|---|---|---|---|---|---|
| | Example No. | TiO$_2$ (part by wt) | Electricity charge | Chelating agent (part by wt) | Alkaline substance (part by wt) | pH | Dispersion | Appearance | Adhesion | Pencil hardness | Photocatalytic activity |
| Example | 12 | 60 | − | Glycolic acid (20) | 35 | 6.8 | Disp. | Good | Good | 2H | 280 |
| | 13 | 80 | − | Lactic acid (7) | 45 | 7.4 | Disp. | Good | Good | 2H | 290 |
| | 14 | 55 | − | Pyrophosphoric acid (10) | 25 | 7.4 | Disp. | Good | Good | 2H | 350 |
| | 15 | 60 | − | Pyrophosphoric acid (5) | 40 | 8.2 | Disp. | Good | Good | 2H | 340 |

TABLE 2-continued

| | Composition and properties of produced TiO₂ sol | | | | | Properties of coating | | | | |
|---|---|---|---|---|---|---|---|---|---|---|
| Example No. | TiO₂ (part by wt) | Electricity charge | Chelating agent (part by wt) | Alkaline substance (part by wt) | pH | Dispersion | Appearance | Adhesion | Pencil hardness | Photocatalytic activity |
| 16 | 80 | – | Tripolyphosphoric acid (20) | 5 | 9.0 | Disp. | Good | Good | 2H | 320 |
| 17 | 40 | – | Tartaric acid (7) | 6 | 7.5 | Disp. | Good | Good | 2H | 330 |
| 18 | 80 | – | Pyrophosphoric acid (5) | 2 | 9.8 | Disp. | Good | Good | 2H | 360 |

Tables 1 and 2 clearly show that the conventional titanium dioxide sols and the titanium dioxide sol produced in Comparative Examples 1 to 4 in accordance with the conventional methods did not exhibit satisfactory coating properties for the material having low resistance to corrosion and deterioration. The titanium dioxide colloid sols produced in Examples 1 to 18 in accordance with the production methods of the present invention exhibited satisfactory coating properties.

INDUSTRIAL APPLICABILITY

As explained in detail above, the titanium dioxide colloid sol of the present invention is a neutral photocatalytic titanium dioxide colloid sol having high stability and dispersibility and usable as a coating material for articles, for example, metal articles having a low resistance to corrosion and organic articles having a low resistance to deterioration. When the titanium dioxide colloid sol is employed for the purpose of decomposition of stains, ultraviolet ray absorption, sterilization, gas decomposition, and water treatment, the sol can be applied to wide various materials, and the problems of the working atmosphere and safety can be solved. Therefore, the titanium dioxide colloid sol and the method of producing the sol of the present invention are industrially valuable.

What the claimed is:

1. A titanium dioxide colloid sol comprising 50 to 100 parts by weight of titanium dioxide colloidal particles charged with negative electricity and 5 to 50 parts by weight of a complexing agent and 1 to 50 parts by weight of an alkaline substance, the complexing agent comprising at least one member selected from the group consisting of condensed phosphoric acids and condensed phosphate salts.

2. The titanium dioxide colloid sol as claimed in claim 1, wherein the pH value of the titanium dioxide sol is 5 to 10.

3. The titanium dioxide colloid sol as claimed in claim 1, wherein the alkaline substance comprises at least one member selected from the group consisting of ammonium compounds, alkali metal compounds and amine compounds.

4. The titanium dioxide colloid sol as claimed in claim 1, wherein the alkaline substance comprises at least one member selected from the group consisting of oxazine, piperidine and choline compounds.

5. A method of producing a titanium dioxide colloid sol characterized by mixing an alkaline substance into an acid titanium dioxide colloid sol containing 50 to 100 parts by weight of titanium dioxide colloid sol and 5 to 50 parts by weight of a complexing agent, to adjust the pH value of the sol to a level of 5 to 10, and to thereby cause the titanium dioxide colloidal particles to be charged with negative electricity, the complexing agent comprising at least one member selected from the group consisting of condensed phosphoric acid and condensed phosphate salts.

6. The method of producing the titanium dioxide colloid sol as claimed in claim 5, wherein the alkaline substance comprises at least one member selected from the group consisting of ammonium compounds, alkali metal compounds and amine compounds.

7. The method of producing the titanium dioxide colloid sol as claimed in claim 5, wherein the alkaline substance comprises at least one member selected from the group consisting of oxazine, piperidine and choline compounds.

8. A method of producing al titanium dioxide colloid sol, characterized by mixing an alkaline substance into an acid titanium dioxide colloid sol comprising 50 to 100 parts by weight of titanium dioxide colloidal particles and 5 to 50 parts by weight of a complexing agent to adjust the pH value of the resultant sol to a level of 6 to 12, and applying a deionization treatment to the sol to thereby cause the titanium dioxide colloidal particles to be charged with negative electricity.

* * * * *